(12) United States Patent
Hernandez, III

(10) Patent No.: US 7,343,586 B1
(45) Date of Patent: Mar. 11, 2008

(54) TECHNOLOGY TO CREATE/EDIT/RUN AN EXECUTABLE FILE ON A HOST VIA A WEB BROWSER CONNECTED THERETO

(75) Inventor: Gasper Hernandez, III, Andover, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 610 days.

(21) Appl. No.: 09/722,576

(22) Filed: Nov. 28, 2000

Related U.S. Application Data

(63) Continuation-in-part of application No. 09/407,885, filed on Sep. 29, 1999.

(51) Int. Cl.
G06F 9/44 (2006.01)
G06F 9/45 (2006.01)
G06F 15/16 (2006.01)

(52) U.S. Cl. .................... 717/124; 717/110; 717/115; 717/140; 709/217; 709/219

(58) Field of Classification Search ............. 717/110, 717/114–115, 136, 139–140, 124; 709/200–205, 709/227–232, 310–311, 217–219; 707/505–508, 707/511, 200; 345/744; 455/67.11
See application file for complete search history.

(56) References Cited

U.S. PATENT DOCUMENTS

| | | | | |
|---|---|---|---|---|
| 5,768,578 A | * | 6/1998 | Kirk et al. .................. 707/100 |
| 5,898,835 A | * | 4/1999 | Truong ....................... 709/217 |
| 5,963,952 A | * | 10/1999 | Smith .......................... 707/102 |
| 6,041,331 A | * | 3/2000 | Weiner et al. ........... 707/103 R |
| 6,085,227 A | * | 7/2000 | Edlund et al. ............... 709/203 |
| 6,101,503 A | * | 8/2000 | Cooper et al. ............ 707/104.1 |
| 6,112,242 A | * | 8/2000 | Jois et al. .................... 709/203 |
| 6,269,254 B1 | * | 7/2001 | Mathis ....................... 455/557 |
| 6,336,072 B1 | * | 1/2002 | Takayama et al. ........... 701/200 |
| 6,434,615 B1 | * | 8/2002 | Dinh et al. .................. 709/224 |
| 6,449,661 B1 | * | 9/2002 | Fujishima ....................... 710/5 |
| 6,516,339 B1 | * | 2/2003 | Potts et al. .................. 709/203 |
| 6,516,340 B2 | * | 2/2003 | Boys ............................ 709/204 |
| 6,598,023 B1 | * | 7/2003 | Drummond et al. ............ 705/1 |

OTHER PUBLICATIONS

S. Morton, "Reading CGI Data: url-encoding and the CGI protocol", 1998.*
J. Niederst, "Web Design in a Nutshell", Jan. 1999.*

\* cited by examiner

*Primary Examiner*—Meng-Al T. An
*Assistant Examiner*—Jason Mitchell

(57) ABSTRACT

Methods, software and devices, for use in a network environment having a server and a terminal with a web browser running on it, where the browser is remote from the server, are disclosed. In such a method, the server provides a first web page to the web browser on the remote terminal. The server receives the text from the web browser at the remote terminal, and the server executes the text. The server provides or updates a second web page to the remote terminal that includes real time results generated by the execution of the text such that the executable file represented by the text seems to a user of the web browser to have been executed at the remote terminal.

25 Claims, 6 Drawing Sheets

TECHNOLOGY TO CREATE/EDIT/RUN AN EXECUTABLE FILE ON A HOST VIA A WEB BROWSER CONNECTED THERETO

CONTINUING APPLICATION DATA

This application is a continuation in part of U.S. patent application Ser. No. 09/407,885 filed on Sep. 29, 1999, the entire contents of which are hereby incorporated by reference.

FIELD OF THE INVENTION

The invention is generally directed toward networks that include remote web browsers and a host, and is more particularly directed toward technology to permit a remote web browser to create/edit/run an executable file where the compiler/interpreter is located on the host, and is more particularly directed to such a system where the host is connected so as to monitor, test and/or manipulate a wireless communications network.

BACKGROUND OF THE INVENTION

A script is a sequence of commands that are to be interpreted, i.e., executed by a program running on a processor, as contrasted with a program that is compiled into machine code of a processor and then directly executed by a processor. Such a programmed processor that interprets a script is typically referred to as an interpreter. A script can be generated using a text editor. As an alternative, it is known to provide a graphical user interface (GUI) that permits a user to write a script by assembling commands and their arguments from pull-down menus. Such a GUI for scripting is typically referred to as a scriptor.

As an example, a script written in the Wireless Automation Manager Interface Language (WAMIL), that is the subject of a co-pending application, will be considered after a general discussion concerning wireless technology. The general discussion of wireless technology is presented to ensure an appreciation of the context of this script, and others, that will follow as well as a preferred use for the disclosed invention.

Large systems often include monitoring systems that permit one or more users to monitor the performance of the system in general, and to specifically monitor the state of one or more parameters of the large system. In some instances, the manner in which the monitoring system delivers information to the user can be a burden.

An example of the large system discussed above is a wireless communication network that provides wireless communications service to a wireless unit that is situated within a geographic region. A Mobile Switching Center (MSC) is responsible for, among other things, establishing and maintaining calls between wireless units and calls between a wireless unit and a wireline unit. As such, the MSC interconnects the wireless units and calls between a wireless unit and a wireline unit. As such, the MSC interconnects the wireless units within its geographic region with a public switched telephone network (PSTN). The geographic area serviced by the MSC is divided into spatially distinct areas called "cells." In a schematic block diagram, each cell could be schematically represented by one hexagon in a honeycomb pattern. But, in practice, each cell has an irregular shape that depends on the topology of the terrain surrounding the cell. Typically, each cell contains a base station, which comprises the radios and antennas that the base station uses to communicate with the wireless units in the cell. The base stations also comprise the transmission equipment that the base station uses to communicate with the MSC in the geographic area via communication links. Cell coverage area may be broken up into sectors. One cell site may sometimes provide coverage for several sectors.

In a wireless cellular, communications system, a base station and a wireless. unit communicate voice and/or data over a forward link and a reverse link, wherein the forward link carries communication signals over at least one forward channel from the base station to the wireless unit and the reverse link carries communication signals on at least one reverse channel from the wireless unit to the base station. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), Code Division Multiple Access (CDMA) and others.

Within the geographic region, the MSC switches a call between base stations in real time as the wireless unit moves between cells, referred to as a handoff. Currently, in FDMA, TDMA, CDMA and GSM, cell site planning to determine the geographic coverage for a cell is manually intensive tasks that needs constant adjustment. In planning a cell, the topology of a geographic area and a suitable antenna site is selected based on availability and zoning rules. Such a selection is typically not optimal but adequate. Drive tests and manually collecting signaling data are then performed mostly on the perimeter of the coverage area. Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

Lucent Technologies Inc. has developed a monitoring system that a user can use to change parameters of the wireless communication system as well as to extract data about it. This monitoring system can generate the TIpdunix (TI) interface, the Status Display Page (SDP) interface and/or the AUTOPLEX Recent Change & Verification Database (AOXRCV) interface. These interfaces can be used individually. But typically, information extracted from one of the interfaces is used to make a decision to use a second one of the interfaces in one way or another. To use an interface, a user must start a discrete process. In a windows-based environment, each interface session has it own window.

Example SCRIPT No. 1, mentioned above, follows.

| SCRIPT No. 1 | |
| --- | --- |
| Line | Command |
| 01 | WAM:MSC 5 |
| 02 | WAM:CELL 123 |
| 03 | WAM:BBA 8 |
| 04 | WAM:CONNECT TI |
| 05 | TI:op:cell 123, bba 8 |
| 06 | WAM:DISCONNECT TI |
| 07 | WAM:ENDTEST |

Such a script as SCRIPT No. 1 gathers information about the BCR/BIU/ACU Trio No. 8, or BBA 8, located in cell No. 123 of mobile switching center No. 5 using the TI interface.

A technician in the field physically present at the cell 123 might desire the output of SCRIPT No. 11 as a starting point to servicing cell No. 123, particularly BBA No. 8, or might desire to run SCRIPT No. 1 to confirm a repair/adjustment that the technician has made.

If the technician could access a network where this script could be run by a server, then this would be very helpful to the technician. But hard-wired network connections are not typically provided at cell sites. So, as a practical matter, this tool is not available to the technician working at cell 123.

Alternatively, the technician could place a telephone call to a colleague present at a hard-wire network connection and request the colleague to run this script. But this would require the colleague to verbally relay the output of script No. 1. In some instances, the output is a simple numeric value or an indication of whether the tested component is active or idle. But in the great majority of instances, the output of such a script contains a great amount of data that is difficult, at best, to describe verbally over the telephone.

Now, assume that SCRIPT No. 1 was not present on the server or did not test/effect the exact component desired by the technician in the field. Again, at most, the technician could call his colleague, describe the desired script or modification to an existing script, and await his colleague's reply, assuming that the colleague could verbally describe the output of the test script.

All scripting languages are not particular to wireless technology, nor are all scripts written with a wireless communication network in mind. Suppose a script was written in an appropriate language for the banking industry. A technician physically present at an automated teller machine (ATM) in the field might wish to test a particular component in the ATM as part of the service procedure. That technician would encounter the same problems described above concerning a service procedure at the cell of the wireless network.

SUMMARY OF THE INVENTION

The invention is, in part, a recognition of the desirability of being able to run scripts, that access a monitoring system (for monitoring, testing and/or manipulating a large system such as a wireless communications network), from a location so remote from the system upon which such scripts run that no hard-wired terminal is available at the remote location.

The invention also is, in part, recognition of the need/desirability of being able to create and run such scripts from a non-hardwired terminal, e.g., at a location remote from the host upon which the scripts would run.

The invention, in part, provides a method (and the associated program and programmed device) that can syntax check and/or run an executable file, e.g., a script, via a remote terminal, e.g., a web browser on a PC, that actually passes it to the host, e.g., a network server, for the syntax checking or execution thereon. Such a method comprises: the server providing a first web page to said web browser running on said remote terminal, the first web page being configured to receive text representing an executable file; the server receiving a request, including said text, from said web browser at the remote terminal; the server doing at least one of checking the syntax of said text and executing said text; and the server providing at least a first version of a second web page to said remote terminal that includes results generated by the check for syntax or execution of said text.

The invention also, in part, provides a corresponding method (and the associated program and programmed device) that makes it possible for the web browser to contact to, and exchange information with, the host so as to the host syntax check and/or execute an executable file that was entered into said browser. Such a method comprises: the web browser, running on said remote terminal, receiving a first web page from said server, the first web page being configured to receive text representing an executable file; the web browser receiving said text representing said executable file from a user; the web browser making a request to said server that includes said text representing an executable file; the web browser receiving at least a first version of a second web page from said server that includes results generated by said server doing at least one of syntax checking and execution of said text.

The invention also, in part, more broadly provides a method that can run an executable file resident on a server by way of a web browser remotely connected to the server, e.g., via the internet, in order to test and/or manipulate a system that is separate from the server. Such a method comprises: the server receiving a request from said web browser at the remote terminal to execute said executable file on said server; the server executing said executable file thereby causing said separate system to be tested or manipulated; and the server providing at least a first version of a web page to said remote terminal that includes results generated by the execution of said executable file. The invention also, in part, provides a corresponding method (and the associated program and programmed device) that makes it possible for the web browser to contact, and exchange information with, the server via, e.g., the internet, in order to test and/or manipulate the separate system. Such a method comprises: the web browser making a request to said server to execute said executable file thereon to cause said separate system to be tested or manipulated; and the web browser receiving at least a first version of a web page from said server that includes results generated by the execution of said executable file. An example of the separate system is a wireless communications network and an example of the executable file is a script written in the Wireless Automation Manager Interface Language (WAMIL) scripting language.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF PREFERRED EMBODIMENTS

Figure 1:
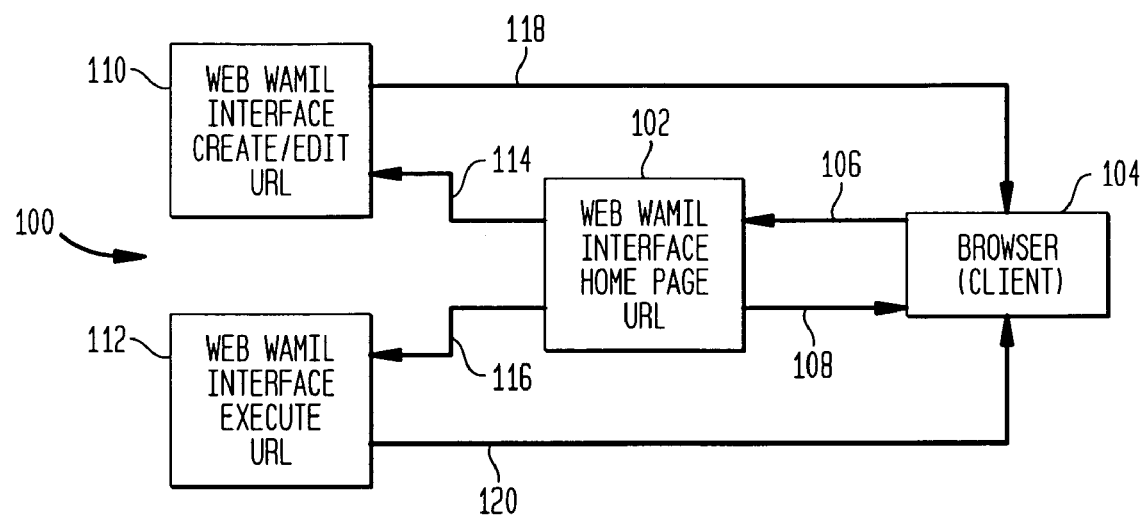
FIG. 1 is a block diagram depicting an example embodiment of the invention.

FIG. 1 is a block diagram depicting an example embodiment of the invention. The system 100 of FIG. 1 includes:
- a web Wireless Automation Manager Interface Language (WAMIL) interface homepage URL 102 which is loaded and displayed by a browser or client 104 via path 108;
- a path 106 between the browser 104 and the home page 102;
- a web WAMIL interface execute URL 112 which is accessible via a link;
- 116 from the homepage URL 102 to the execute URL 112 and which is loaded and displayed on the browser 104 via a path 120 from the execute URL to the browser 104; and
- a web WAMIL interface create/edit URL 110 which is accessible via a link 114 from the homepage URL 102 to the create/edit URL 110 and which is loaded and displayed on the browser 104 via a path 118 from the create/edit URL 110 to the browser 104.

Figure 2:
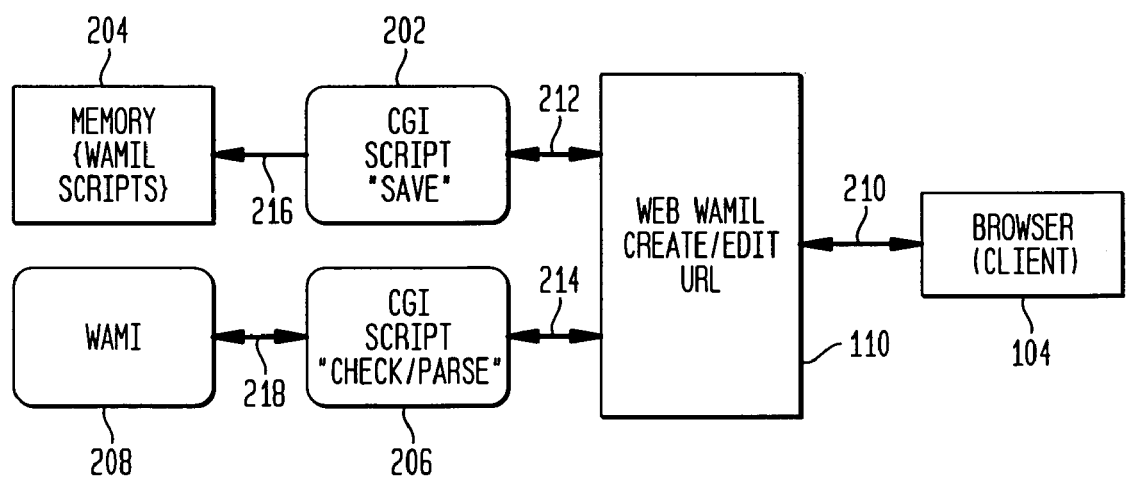
FIG. 2 is a more detailed block diagram depiction of an aspect of FIG. 1.

FIG. 2 is a more detailed block diagram depiction of an aspect of FIG. 1. In FIG. 2, a bidirectional path 210 between the browser 104 and the create/edit URL 110 is intended to represent the path 106 from the user accessing a link on the interface homepage URL 102 a via a path 114 and the path 118 of FIG. 1 in which URL 110 is loaded and displayed in the browser 104. The create/edit URL 110 accesses CGI "save" script functionality 202 via a bidirectional path 212. The script save functionality 202 saves scripts to a memory 204 that can store programs or scripts, such as WAMIL scripts, via path 216. Alternatively, the create/edit URL 110 can access CGI "check/parse" script functionality 206 via a bidirectional path 214. The check/parse script functionality 206 can access a wireless automation manager interpreter (WAMI) 208 via a bidirectional path 218. Both script functionalities 202 and 206 can be embodied a single CGI script.

Figure 3:
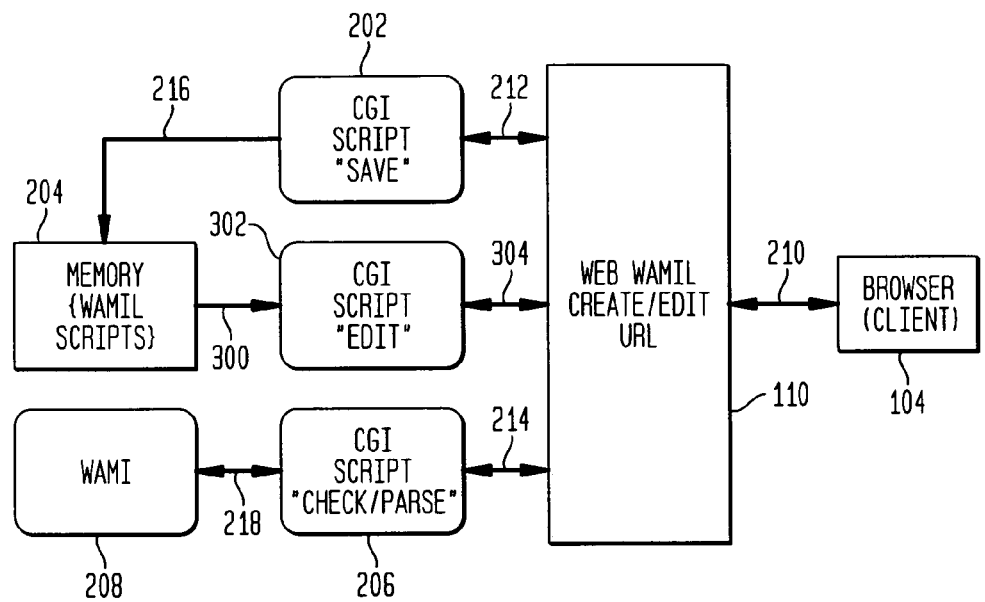
FIG. 3 is a more detailed block diagram depiction of another aspect of FIG. 1.

FIG. 3 is a more detailed block diagram depiction of another aspect of FIG. 1. In FIG. 3, the create/edit URL 110 can access CGI "edit" script functionality 302 via a bidirectional communication path 304. The script edit functionality 302 can read a stored program or script from the memory 204 via the communication path 300 and then make it possible for the client to edit that program/script. Similarly, script functionality 302, 202 and 206 can be embodied in a single CGI script.

Figure 4:
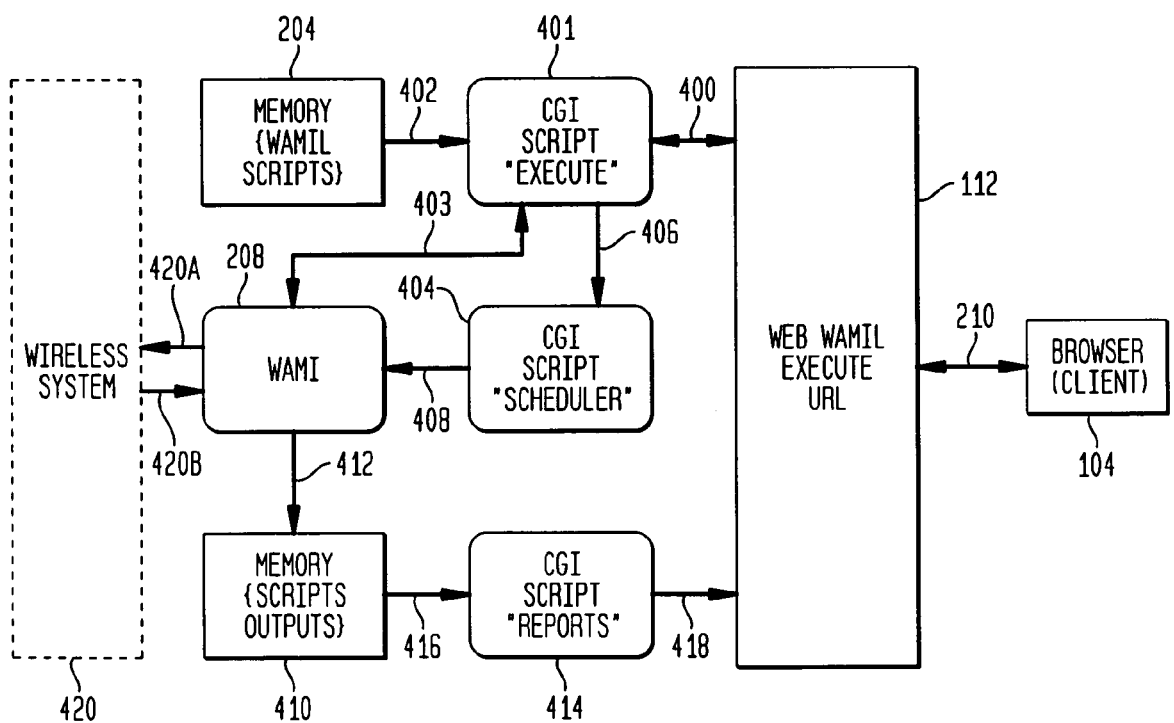
FIG. 4 is a more detailed block diagram depiction of yet another aspect of FIG. 1.

FIG. 4 is a more detailed block diagram depiction of yet another aspect of FIG. 1. In FIG. 4, a bidirectional path 210 between the browser 104 and the execute URL 112 is intended to represent the paths 106 from the user accessing a link on the homepage URL 102, via communication path 116 and the path 120 in which URL 112 is loaded and displayed in the browser 104. FIG. 4 includes a CGI "execute" script functionality 401 connected to the execute URL 112 via a bidirectional path 400. The execute script functionality 401 can read scripts from the memory 204 via the path 402. A path 406 is provided from the execute script functionality 401 to a server/scheduler 404. A path 408 from the scheduler 408 to the WAMI 208 is provided. A bidirectional path 403 from the execute script functionality to the WAMI 208 is also provided. Paths 420A and 420B represent bidirectional communications between the WAMI 208 and a large system 420, e.g., a wireless communications network such as is described above in the section entitled "Background of the Invention". A path 412 from the WAMI 208 to a scripts "output" functionality 410 is provided. A path 416 from the scripts output functionality 410 to a CGI script "reports" functionality 414 is provided. And a functionalities path 418 from the reports functionality 414 to the execute URL 112 is provided. Similarly, script functionalities 202, 206 302, 401, 404 and 414 can be embodied in one CGI script.

Figure 6:
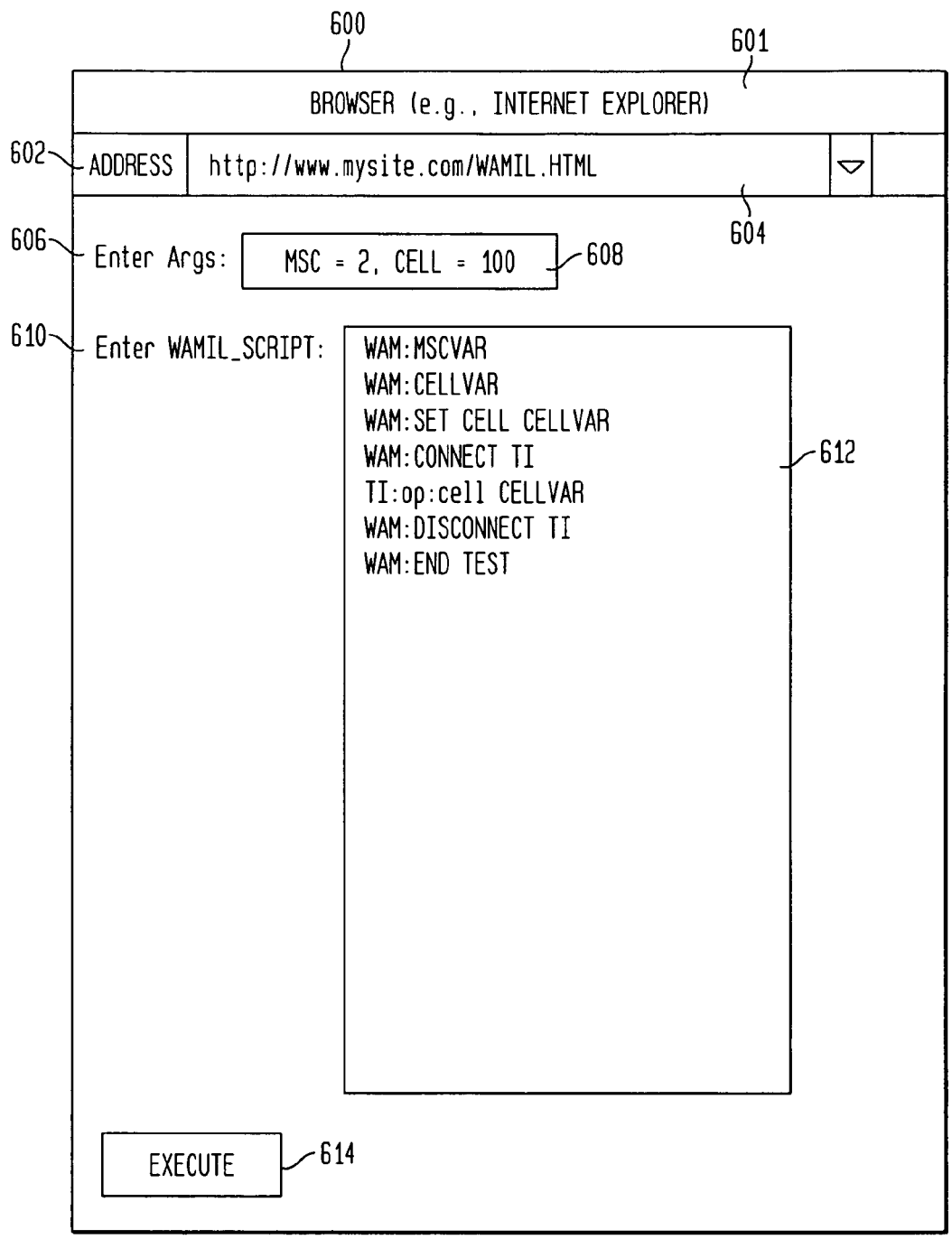
FIG. 6 is a depiction of a web page that can be presented to a user via a web browser according to an example discussed below in the detailed description.

FIG. 6 is a depiction of a web page. A web page is a block of documents or resources available on the World Wide Web (WWW), identified by a Uniform Resource Locator (URL). In the simplest, most common case, a web page is a file written in the Hypertext Markup Language (HTML) and is stored on the server. It may refer to images which appear as part of the page when it is displayed by a web browser. It is also possible for the server to generate pages dynamically in response to a request, e.g. using a Common Gateway Interface (CGI) script. A web page can be in any format that the browser or a helper application can display. The format is transmitted as part of the headers of the response as a Multipurpose Internet Mail Extensions (MIME) type, e.g. "text/html", "image/gif". An HTML web page will typically refer to other web pages and internet resources by including hypertext links. A web site often has a home page (usually just the hostname, e.g. http://www.foldoc.org/).

The web page of FIG. 6 can be presented to a user via a web browser according to an example that will discussed below.

FIG. 6 includes an address label 602 arranged next to a URL input box or form 604. A label 606 is arranged next to an arguments input box or form 608. A label 610, "enter WAMIL Script" is arranged next to a script input box or form 612. And a clickable execute button 614 is provided.

Figure 7:
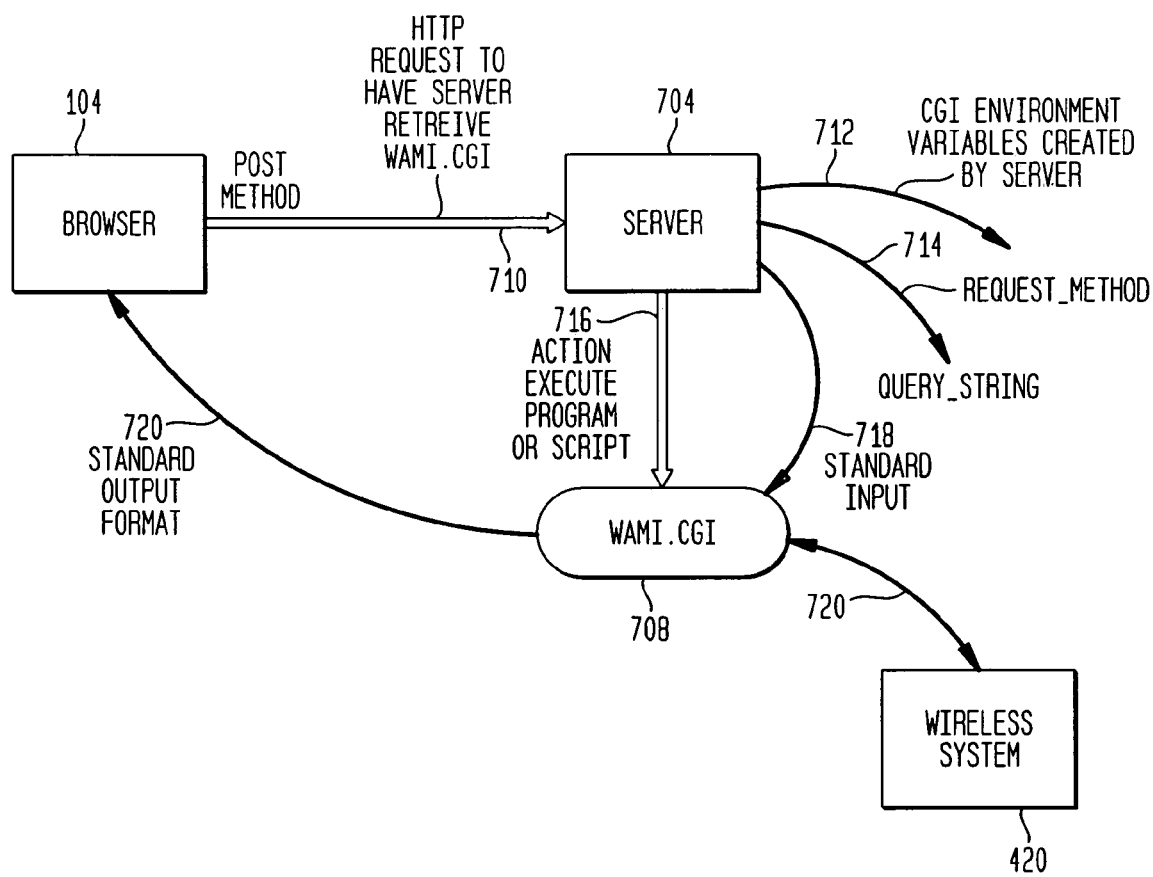
FIG. 7 is a control flow diagram depicting the flow of control in the example discussed below in the detailed description.

FIG. 7 is a flow diagram depicting the flow of control in the example discussed below. In FIG. 7, the browser 104 sends a hypertext transfer protocol (http) request 710 to a host, which in this embodiment can take the form of a server 704. The server 704 generates CGI environment variables denoted by outgoing paths 712 and 714. The server initiates an action request 716 to a CGI script, WAMI.CGI, 708 corresponding to the WAMI 208 embodied within a CGI script. The server 704 transfers the data from the browser 104 to the WAMI.CGI 708 via the standard input as denoted by the communication path 718 according to the CGI via the POST method. A bidirectional communication path 720 corresponding to the communication paths 420*a* and 420*b*, between the WAMI.CGI 708 and the wireless system 420, is provided. The WAMI.CGI script 708 sends it results to the browser 104 via standard output as denoted by the communication path 720.

Figure 8:
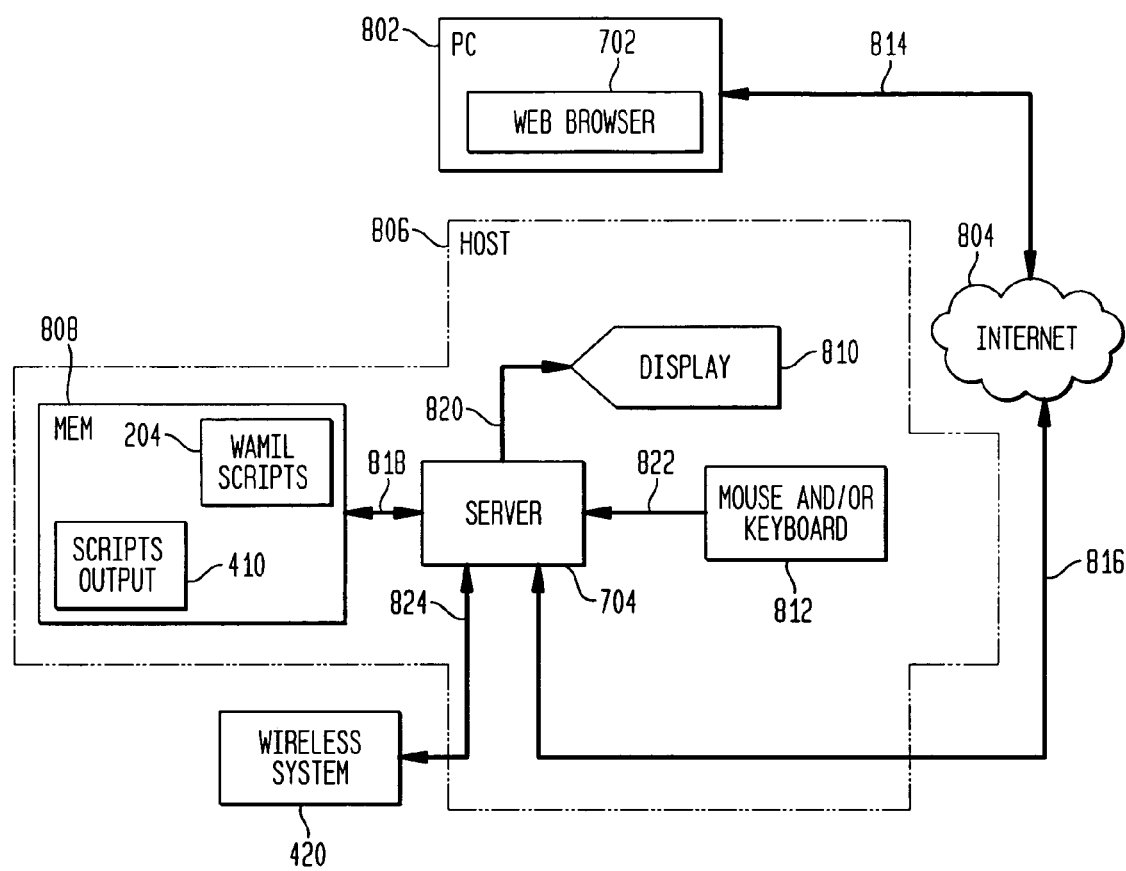
FIG. 8 is schematic block diagram of example hardware for implementing the methods according to the invention.

And FIG. 8 is schematic block diagram of example hardware for implementing the methods according to the invention. In FIG. 8, the web browser 702 is depicted as being a program running on a personal computer (PC) 802.

The PC 802 is depicted as being connected bidirectionally to the host 806, in particular the server 704 defining the main component of the host 806, via the internet 804 and the communication links 814 between the PC 802 and the internet 804 and the communication link 816 between the internet 804 and the server 704. The host includes a memory device 808, containing the memories 204 and 410, connected by a bidirectional communication path 818 to the server 704. A communication path 820 is provided from the server 704 to a display unit 810. Optionally, communication path 822 is provided from a user input device, such as a mouse and/or keyboard, 812 to the server 704. And optionally a bidirectional communication path 824 is provided between the wireless system 420 and the server 704, the path 824 corresponding to the communication paths 420a, 420b and 720.

The memory 808 stores one or more programs or scripts that cause the server 704 to operate, this operation including running a CGI script according to the invention. The CGI scripts according to the invention have been written in the scripting language, komshell, that is widely available upon UNIX-based operating systems. And the CGI scripts in part embody the WAMI 208. The computer/readable memory 808 can include RAM, ROM, a fixed hard disk drive, and/or a removable storage medium for a non-fixed drive such as a floppy disk, removable hard drive or a CD ROM. The server 704 also runs a program that causes it to generate the WAMI 208. The WAMI 208 performs many sorting and comparison operations as well as accesses to look-up tables (LUTs). As such, the server 704 should be of sufficient processing power to assure reasonably quick results. Examples of adequate processors are those from the Pentium family of processors manufactured by Intel Inc. Details of the WAMI 208 are contained in a first copending U.S. patent application, entitled "Scriptor and Interpreter," by the same inventor, Gasper Hernandez, III, filed on Sep. 29, 1999, and having U.S. patent application Ser. No. 09/407,885, that it is assigned to the same Assignee, Lucent Technologies, Inc. The entire contents of this first copending application are hereby incorporate by reference.

The "save" script functionality 202, the "check/parse" functionality 206, the "edit" script functionality 302, the "execute" script functionality 401, the "reports" script functionality 414 and 404 can be tailored to work with a great many scripting languages and collectively embody the WAMI 208, which processes the wireless automation manager interface language (WAMIL) that is the subject of a second copending application. The WAMIL language includes commands, if-construct elements and while-construct elements. A WAMIL command has the format of "INTERFACE:COMMAND," e.g., "TI:OP:CELL ARGUMENT", "WAM:CONNECT SDP", or "WAM:GETSDP". In other words, a WAMIL command has a first field that identifies an interface and a second field that identifies a command. The first field actually identifies the interface in which the command of the second field is valid. Preferably, the first field proceeds, or is a header for, the second field and is separated by an alphanumeric character such as a colon.

Details of the WAMIL language are contained in the second copending U.S. patent application entitled "Multiple Interface Scripting Language," by the same inventor, Gaspar Hernandez, III, filed on Sep. 29, 1999. having U.S. patent application Ser. No. 09/407,890 that is assigned to the same Assignee, Lucent Technologies Inc. The entire contents of this second copending application are hereby incorporated by reference.

Operation of the example embodiments as depicted in the figures will now be discussed.

An important embodiment of the invention is one that makes the WAMI 208 available to a web browser 104 via the Internet, where the WAMI 208 operates upon WAMIL language scripts. This embodiment has been described as a WAMIL web interface or alternatively as web WAMIL. The web WAMIL embodiment can have two main interfaces, which here are referred to as uniform resource locators (URLs). For ease, both of these URLs can be located within the same website, with a web WAMIL homepage URL 102 that can allow a visitor to the homepage to select either of these URLs. The first URL is the create/edit URL 110 and the second URL is the interface execute URL 112.

Examples of an appropriate web browser 104 are Internet Explorer manufactured by Microsoft or Navigator manufactured by Netscape Communications.

Alternatively, a WAMIL website can be embedded and implemented within any existing URL. So, alternatively, a browser can directly access the create/edit URL 110 or the execute URL 112 by typing their respective URLs into the address input box or form (not shown) of the browser, thereby never having to load the web WAMIL homepage URL 102. The homepage URL simply gives a user of the browser a reference starting point. The homepage URL can also serve as a site to host additional information, such as documentation and/or tutorials about the WAMIL language and/or the WAMI 208.

In FIG. 2, a WAMIL script can be created by a visitor simply typing the WAMIL script into the script input box or form (not shown) on the create/edit URL 110 as well as entering a name for the WAMIL script into a script name text entry box or form (not shown). The save script functionality 202 or the check/parse script functionality 206 can be selected by the user selecting either a save or check syntax button (not shown) on the create/edit URL 110. The save script functionality 202 causes the newly created script to be saved in memory 204. By default the WAMIL script can be saved in a predefined location that stores all WAMIL scripts. Alternatively, the user can specify another location by supplying a full path name. For security purposes, it is recommended that only certain path names be accepted as alternative storage locations.

Optionally, the save script functionality 202 can generate a results page to be sent to the browser 104 to confirm a degree of success of the save operation.

After a client, again the user of the browser 104, has created a new WAMIL script by simply typing it into the script input box or form of the create/edit URL 110, the client can choose to check the syntax of the newly-created script. This can be done before or after saving the script. If he or she desires to check the syntax of the script, the user can click on the check/parse button (not depicted) of the create/edit URL 110 in order to activate the check/parse script functionality 206. The check/parse script 206 will parse the script, i.e., will check its complete syntax, and return results, including any errors. The check/parse script 206 does this by passing the data representing the script to the wireless automation manager interpreter (WAMI) 208 via the bidirectional communication path 218. The WAMI 208 actually checks the syntax of the script and determines whether there are errors, and if so generates an output indicative of those errors. The check/parse script 206 will take the results generated by the WAMI 208 and create a page containing these results that is to be displayed to the client. The result page can include any syntax errors as well as the lines on which the errors occurred. Also, the results page can redisplay the script that was parsed by the WAMI 208 so that the client can edit the script accordingly. Then, the client can choose to correct the errors in the script and perform another syntax check, or save the script for editing later.

FIG. 3 depicts a situation in which a client chooses to edit an existing WAMIL script. The client can select the WAMIL script to be edited from a pull down menu (not shown) on the create/edit URL 110 and then can activate the edit script functionality 302 by clicking on an edit button (not shown) on the create/edit URL 110. The edit script 302 then causes the selected script to be loaded from the memory 204 via the communication path 300 resulting in the selected script being displayed in the script input box or form (not shown) of the create/edit URL 110. Similarly, the create/edit URL can allow a client to select a WAMIL script from other than the default area for the storage of WAMIL scripts, assuming that the requested location is an accessible area based upon the client's security rating. Once the selected script has been loaded to the create/edit URL, the client can again edit the script and perform a syntax check and/or save the edited script by overwriting the original script or saving it under a different name.

FIG. 4 depicts the scenario in which a client chooses to execute a WAMIL script. To do so, a client selects an existing script in the same manner that a selection is made when a client desires to edit an existing script. Then, the client can activate the "execute" script functionality 401 by clicking on the execute button (not depicted) on the execute URL 112. The execute script 401 retrieves the selected script from the memory 204 via the communication path 402. Typically, but not necessarily, the selected script will be one that the client just created.

If the client chooses immediate execution of the selected script, the execute script functionality 401 will pass the selected WAMIL script to the WAMI 208 via the bidirectional communication path 403. The WAMI 208 will then run the selected script which causes interactions and/or information exchanges 420a and 420b with the wireless system 420. The WAMI 208 will transmit the results of the script back to the execute script functionality 401 via the bidirectional communication path 403. The execute script functionality 401 will generate a web page depicting the results that is to be sent to the client. Such a results output page can be updated in real time, i.e., can be made to seem dynamic, which allows the client to view the script execution as it progresses.

The WAMI 208 can, at the same time, log the script output and results in a specified directory. This creates an output report file which can be viewed at a later time by the client by selecting a report button (not shown) on the execute URL 112. The reports button causes the reports script functionality 414 to be activated, which retrieves the desired output report file from the memory 410 via the communication path 416. The desired output report file is selected in a manor similar to how a client selects a desired script to be executed. The reports script functionality 414 then generates a page with the desired output report file that is to be displayed to the client.

A client can also choose to delay the execution of a script until a specified date and time or periodically repeat execution of the script, for example every Friday at a specified time in the afternoon. If so, the execute script functionality 401 will pass the name of the selected WAMIL script to the scheduler 404 via the communication path 406 instead of directly to the WAMI 208 via the bidirectional communication path 403. As such, the scheduler functionality 404 can treat the delayed execution as either a "cron" job in the case of periodic execution, or as an "at" batch job for a singular execution. In addition to passing the name of the desired WAMIL script, the execute script functionality 401 also passes the additional and/or date information needed to describe the delay information. At the appropriate times, the scheduler script functionality 404 will pass the name of the desired script, its location and argument(s) to the WAMI 208, thereby causing the desired script to be executed. Unlike the immediate execution scenario described above, the real time results of the execution are not routed back to the client. Instead, the WAMI 208 simply logs the script output and results in the memory 410 as an output report file. Later, the client can access this report as described above. This frees the client from having to sit and watch the browser 104. The client can exit the browser 104 and return to it at a later time after execution of the script has completed.

An example will now be described in order to provide context for the discussion of the flow chart of FIG. 5.

Suppose a user of the browser 104, i.e., a client, wished to access the create/edit URL 110. Server 704 could run a CGI script that could generate a simple hypertext mark-up language (HTML) file to be displayed as the create/edit URL 110. For the purposes of advancing discussion, a simple HTML file, WAMIL.HTML is to be provided as part of the example. It is noted that this simple example does not represent the create/edit URL 110.

<HTML>
<BODY>
<FORM METHOD=POST ACTION WAMI.cgi>
   Enter Args: <INPUT TYPE=TEXT NAME=WAMIL_ARGS>
   Enter WAMIL Script:
   <TEXTAREA NAME=WAMIL_SCRIPT COLS=80 ROWS=40>
   <TEXTAREA><BR>
   <INPUT TYPE=submit VALUE=EXECUTE>
</FORM>
<BODY>
</HTML>

Here, the form tag denotes that the method for passing data to the server will be the POST method ("POST method=POST") while the action to be selected by the browser is the file WAMI.CGI (action=WAMI.CGI). The HTML file will generate a label "Enter Args:" and will provide a text box or form next to it. The HTML file denotes this box as a text box via the attribute "input type=text". The HTML file defines the text typed by the user into this box as the environment variable WAMIL_ARGS, as denoted by the attribute "name=WAMIL_ARGS".

The HTML file also generates a label "Enter WAMIL Script:". Next to that label it provides a large text box or field into which the user will type the actual script. The HTML file defines the text to be typed into this area by the user as an environment variable named (attribute "name=WAMIL_SCRIPT"). The dimensions of this textbox are set according to the attributes "COLS=80" and "ROWS=407".

Lastly, the HTML file provides a button labeled execute, which the user can click in order to send the script from the browser 104 to the server 704. The label on the button is defined in the HTML file by the attribute "value=execute" while the type of button is characterized by the attribute "type=submit".

FIG. 6 depicts the look of a web page 600 created by the example HTML file described above. The page 600 includes a title bar 601 that indicates the page is being generated via a browser 104. As is typical of browsers 104, an address label 602 is provided next to a URL input box or form 604. In FIG. 6, the fictitious URL (i.e., it is part of the example), http://www.mysite.com/wamil.html, has been entered by the user in order to access the above example 110. The web page 600 has the "Enter Args:" label 606 positioned on the same line as the arguments input box 608. In FIG. 6, the user has typed information concerning two variables, namely MSC=2 and CELL=100 and has separated these two pieces of information by a comma (i.e., they are comma-delimited). The web page 600 also has the label "Enter WAMIL Script:" 610 positioned next to the large textbox or form 612. In the script box 612, the user has typed his desired WAMIL script (again, this is merely a simple example of the multitude of scripts that can be written in the WAMIL language). That script will be referred to as SCRIPT No. 2 and is printed below.

WAM: MSCVAR
WAM: CELLVAR
WAM: SET CELL CELLVAR
WAM: CONNECT TI
TI:op:cell CELLVAR
WAM: DISCONNECT TI
WAM: ENDTEST Lastly, the web page 600 includes the execute button 614. The client can click on this button after she has typed in the arguments and the WAMIL script.

FIG. 7 depicts what happens after the user clicks on the execute button 614 of FIG. 6. Clicking on the execute button 614 causes the browser 104 to send an http request 710 to the server 704. The request 710 takes the form of HTTP commands and a URL-encoded string. Multiple fields are included within this string. One such field is the field, "request method=POST. This indicates to the server that the data from the user of the browser, i.e., the client, will be passed to the server in the body of the request 710 and then from the server to the CGI script by way of the script's standard input stream screen. Another field in the request is the field, QUERY_STRING=" ". The lack of alphanumeric text between the quotation marks indicates that no data from the client is being passed as URL-encoded information appended to the URL of the CGI script.

The server 704 parses the request, i.e., the long encoded string from the browser 104, and does the following. First, the server generates the environment variable REQUEST METHOD and sets it equal to POST according to the corresponding field described above as denoted by path 712 of FIG. 7. Similarly, the server 704 generates the environment variable QUERy STRING and sets it equal to a null value according to the corresponding field discussed above, as denoted by the communication path 714. The server 704 executes the CGI script identified by the form ACTION (where ACTION=WAMI.cgi in the example script) as denoted by control flow arrow 716. Lastly, the server 704 provides the data from the text input boxes 608 and 612 to the standard input of the script being executed, namely WAMI.CGI, 708 of FIG. 7, as denoted by the communication path 718.

The WAMI.CGI script 708 operates similarly to the scriptor and interpreter of the first copending application that has been incorporated by reference. It also has additional features that reflect the particular considerations of CGI, which will be discussed below in more detail relative to FIG. 5. The WAMI.CGI script 708 interacts with the wireless system 420 during execution, as denoted by the bidirectional communication path 720. Assuming that the client has not requested delayed execution of the WAMI.CGI 708, the results of its execution are sent and updated/resent in real time via its standard output to the browser 104 as denoted by the communication path 720.

As mentioned above, the request 710 is a long encoded string that includes various fields sent to standard input. Another portion of that string corresponds to the variables and script (Script No. 2) typed into the browser 104 by the user. That portion is reprinted below.

WAMIL_ARGS=MSC=2%2CCELL=100%2C&
WAMIL_SCRIPT=WAM %3AMSCVAR % ODWAM %3ACELLVAR % ODWAM %3A SET %20CELL %20CELLVAR % ODWAM %3ACONNET %20TI % OD TI %3Aop %3Acell %20CELLVAR % ODWAM %3ADISCONNECT %20TI % ODWAM %3AENDTEST Here the two fields are separated by the symbol, &, which is used in URL-encoding to delimit fields. Certain characters in the text typed by the user are susceptible to many different uses according to which language the text corresponds. To deal with this problem, URL encodation converts these characters into their hexadecimal equivalents and denotes this encodation with the symbol, %. Thus, the string, %2C, between the string, MSC=2, and the string, CELL=100, represents the comma that was typed by the user in script box 608. Similarly, the string, %3A, represents a colon. The string, %20, represents a blank space. Alternatively, in some coding conventions, a blank space is represented by a plus symbol, +. And the string, % OD, represents a carriage return. Thus, it can be seen how the encodation represents the text that was typed into the script box 608.

Figure 5:
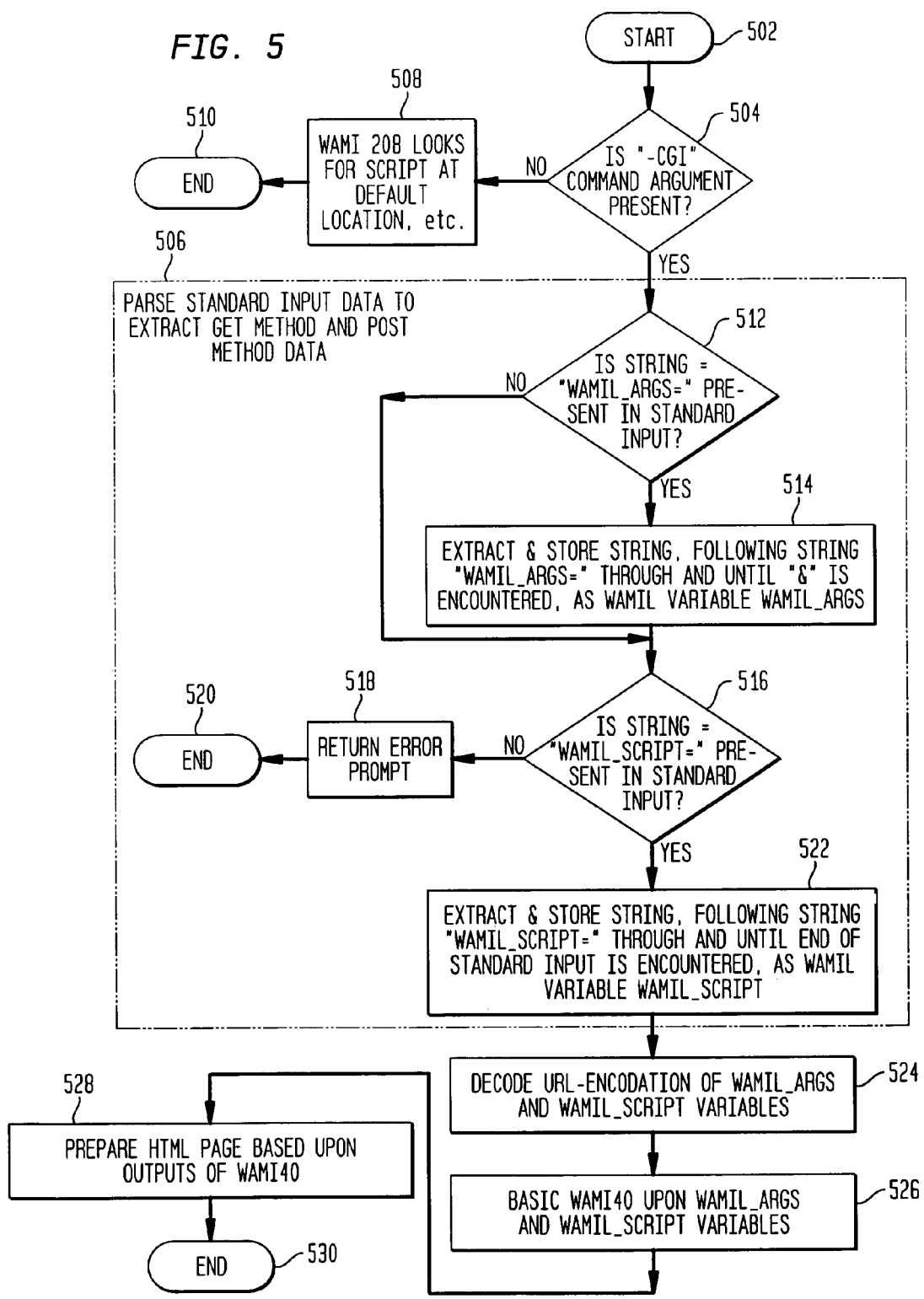
FIG. 5 depicts a flow chart depicting steps carried out by a host that is implementing aspects of FIGS. 1-4.

FIG. 5 depicts a flowchart of additional steps carried out by the CGI script that embodies the WAMI 208 and which CGI aspects. The flow begins in step 502 and proceeds to decision step 504. There, the WAMI 208 checks whether the argument, -cgi, is appended to the command line. The presence of the -cgi argument controls the WAMI 208 to look for the script through the CGI instead of at a default location. Without the -cgi argument, the WAMI 208 either will not find the script, named WAMIL_SCRIPT, at its default location as in steps 508 and 510. This can cause the WAMI 208 to return an error prompt if no such script name is found. Or the WAMI 208 will find another script that coincidentally shares the same name, but which is out of context, producing results that are unrelated to what was expected, or causing the WAMI 208 to return an error prompt because variable values. needed by the coincidental script are not provided. If the -cgi command option is present at decision step 504 of FIG. 5, then flow proceeds to step 506, where the WAMI 208 parses the data provided to the standard input of the WAMI.cgi script so as to extract the data from the client being passed by the CGI method GET and/or the CGI method POST. Flow proceeds from step 506 to 524.

In particular, step 506 includes the steps 512-522. At step 512, the WAMI 208 determines whether the string, WAMIL_ARGS=, is present in the standard input data. If not, then flow proceeds directly to decision step 516. Otherwise, flow proceeds to step 514, where the WAMI 208 extracts and stores the string, following "WAMIL_ARGS=" through and until an ampersand symbol (&) is encountered, as the WAMIL variable, WAMIL_ARGS. The WAMI 208 can store this variable in the default location for WAMIL variables within the memory 808. Flow proceeds from step 514 to decision step 516, where the WAMI 208 determines whether the string, WAMIL_SCRIPT=, is present in the standard input data. If not, flow proceeds to step 518, where an error prompt is returned, and then to the end at step 520. But if so, then flow proceeds to step 522 where the WAMI 208 extracts and stores the string following "WAMIL_SCRIPT=" through and until the end of the standard input data is encountered, as the WAMIL variable, WAMIL_SCRIPT, in the default location for WAMIL scripts within the memory 808. Flow proceeds again from step 522 to step 524.

At step 524, the WAMI 208 decodes the URL-encoded strings that are stored as variable WAMI_ARGS and WAMIL_SCRIPT into ASCII text. The variable WAMIL_SCRIPT now corresponds to a typical script that is to be executed by the WAMI 208 of the first copending application, discussed above that was also incorporated by reference.

At step 526, the WAMIL_SCRIPT variable is operated upon by the WAMI 208 in the manner described in the first copending application. Among other things, the WAMI 208 looks to the default variable known as WAMIL_SCRIPT for the script to operate upon. Further, the WAMI 208 assigns values to the WAMIL global variables referenced within script using the WAMIL variable value pairs found in the default variable known as WAMIL_ARGS.

At step 528, the WAMI.cgi script prepares an HTML page to be provided to the browser 104 which embodies the output of the WAMI 208 as it executes the script, WAMIL_SCRIPT. Flow proceeds to step 530, where execution of the script WAMIL.CGI terminates.

An example of the command line that can be inserted into the WAMIL.CGI script to run the WAMI 208 is as follows:
WAMI40   WAMIL_SCRIPT-webwam   -cgi -user<myname>-stdout rpt/where/to/right/report.

The string, WAMI40, identifies the name of the WAMI 208. The string, WAMIL_SCRIPT, identifies the name of the script that was typed into the browser 104. The command line option, -webwam, indicates to the WAMI 208 that it is running on the server 704. The command line option, -cgi, tells the WAMI 208 to detect and parse the CGI variables so as to convert them into the typical script that is provided to the basic scriptor/interpreter disclosed in the first copending application, as described above in the commentary concerning FIG. 5. The command line option, -USER<MYNAME>, identifies the user of the browser 104 and the WAMI 208. The command line option, -STDOUT, indicates that the WAMI 208 is to output to its default or standard output. And the command line option, -RPT /where/two/right/report, provides a fictitious path (i.e., this is merely another part of the example) to a location where the WAMI 208 should store the report file containing the output results.

As an alternative, instead of a user typing the script into the script input box of the web browser 104, the first web page can be configured to retrieve an existing script from a memory device of the remote terminal. For example, the remote terminal might be a portable/laptop PC, and the technician might type the desired script before connecting via the internet to the server 704. Or, the technician might input the desired script to a personal data assistant (PDA) and then transfer the script from the PDA to the script input box of the web browser 104. One of ordinary skill in the art would understand the modifications needed to practice such alternatives.

The web interface according to the invention has the advantage that it permits script creation and editing to take place at a location remote from the user because the user can connect to the server 704, e.g., via the internet. The scriptor/interpreter, e.g., the WAMI 208, does not need to be present at the user's remote location. The present invention adapts the CGI protocol to permit the script entered by the user to be transferred to the server, where it can be checked for proper syntax, edited and/or executed. As a result, a technician can access the monitoring and testing facilities for a wireless network from any location in the field so long as she has an Internet connection. Accordingly, the web interface according to the invention makes the WAMIL language-based monitoring and testing facilities into a much more flexible tool for use by field technicians, among others.

The embodiments have been discussed in terms of the client typing the text representing an executable file in a scripting language, particularly WAMIL. Alternatively, other scripting languages, such as PERL, could be used. Or the client could type text in a high level programming language. One of ordinary skill in the art would understand how to modify the CGI script so that the server 704 is instructed to call a suitable compiler rather than a scriptor/interpreter such as the WAMI 208.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. In a network environment having a server and a terminal with a web browser running thereon remote from said server, a method of doing at least one of (1) syntax checking and (2) loading and running a script or program that is passed via said browser to said server for syntax checking or execution thereon, the method comprising:
the server providing a first web page including at least one fill-out form to said web browser running on said remote terminal, the first web page being configured to accommodate at any given moment via the at least one fill-out form an entirety of a set of commands that are to be contained in a script or program;
the server receiving a request, including said set in the format of at least one common gateway interface (CGI) variable, from said web browser at the remote terminal;
the server running a CGI script that operates upon the at least one CGI variable to do at least one of (1) checking the syntax of said set and (2) loading said set as a script file or program file into memory and executing said set; and
the server providing at least a first version of a second web page to said remote terminal that includes results generated by the check for syntax or execution of said set;
said CGI script calling a compiler or interpreter on said server and passing said set to said compiler or interpreter;
said compiler or interpreter compiling and running or interpreting said set, respectively;
said compiler or interpreter returning first output data of said set; and
said CGI script building said second web page so as to include said first output data.

2. The method of claim 1, wherein:
said server executes said set by compiling and running or interpreting said set.

3. The method of claim 2, wherein said commands in said set are commands in a Wireless Automation Manager Interface Language (WAMIL) scripting language.

4. The method of claim 1, wherein:
said network is the internet.

5. The method of claim 4, wherein said at least one CGI variable corresponds to at least one of a method GET and a method POST.

6. The method of claim 1, wherein:
said commands in said set are commands in a Wireless Automation Manager Interface Language (WAMIL) scripting language; and
said CGI script calls a Wireless Automation Management Interpreter (WAMI).

7. The method of claim 1, wherein said server is operable to provide additional versions of said second web page to said remote terminal so as to provide real time, dynamic results to a user.

8. The method of claim 1, wherein said set operates upon parameters of a wireless communication network.

9. The method of claim 1, wherein said server is further operable to save said set in memory.

10. The method of claim 1, wherein:
the set accommodated by the first web page is input thereto via manipulation of the web browser by a user thereof.

11. The method of claim 1, wherein:
the set accommodated by the first web page is input thereto via the server for editing by a user of the web browser; and
the request received by the server includes an edited version of the set.

12. In a network environment having a server and a terminal with a web browser running thereon remote from said server, a method of doing at least one of (1) syntax checking and (2) loading and running a script or program that is passed via said browser to said server for syntax checking or execution thereon, the method comprising:
the server providing a first web page to said web browser running on said remote terminal, the first web page being configured to accommodate at any given moment an entirety of a set of commands that are to be contained in a script or program;
the server receiving a request, including said set, from said web browser at the remote terminal;
said server being operable to run a CGI script that calls a compiler or an interpreter to do at least one of (1) checking the syntax of said set and (2) loading said set as a script file or program file into memory and executing said set by compiling and running or interpreting said set;
said compiler or interpreter extracting data corresponding to at least one of GET method and POST method data from said set;
said compiler or interpreter URL-decoding the extracted data GET method and POST method data; and
said compiler or interpreter compiling and running or interpreting the decoded GET method and POST method data; and
the server providing at least a first version of a second web page to said remote terminal that includes results generated by the check for syntax or execution of said set.

13. The method of claim 12, wherein:
said compiler or interpreter is operable to perform the extraction by:
treating data from said browser as an alphanumeric text string;
searching for at least one script-related CGI variable in said alphanumeric text string, said CGI variable containing a portion of said set,
excerpting a part of said alphanumeric text string corresponding to said CGI variable and setting the excerpted string as the value of a predefined variable used by said compiler or interpreter; and
URL-decoding said value of said predefined variable.

14. In a network environment having a server and a terminal with a web browser running thereon remote from said server, a method of doing at least one of (1) syntax checking and (2) loading and running a script or program that has been passed via said browser to said server for syntax checking or execution thereon, the method comprising:
the web browser, running on said remote terminal, receiving a first web page from said server, the first web page including at least one fill-out form configured to accommodate at any given moment via the at least one fill-out form an entirety of a set
the web browser receiving said set from a user;
the web browser making a request to said server, the request including said set in the format of at least one common gateway interface (CGI) variable,
the request being configured to cause a server to run a CGI script that operates upon the at least one CGI variable to do at least one of (1) checking the syntax of said set and (2) loading said set as a script file or program file into memory and executing said set, such a CGI script (1) calling a compiler or interpreter on the server and passing thereto the set by which the set is compiled or interpreted and by which is returned first output data of the set and (2) building a second web page that includes the first output data;
the web browser receiving a the second web page from said server.

15. The method of claim 14, wherein:
said network is the internet.

16. The method of claim 15, wherein said browser embeds said set in said request as said at least one CGI variable according to at least one of a hypertext transfer protocol (http) method GET and a method POST.

17. The method of claim 14, wherein said commands in said set are commands in a Wireless Automation Manager Interface Language (WAMIL) scripting language.

18. The method of claim 14, wherein said browser is operable to receive additional versions of said second web page from said server so as to provide real time, dynamic results to said user.

19. The method of claim 14, wherein said set operates upon parameters of a wireless communication network.

20. The method of claim 14, wherein:
the set accommodated by the first web page is input thereto via manipulation of the web browser by a user thereof.

21. The method of claim 14, wherein:
the set accommodated by the first web page is input thereto via the server for editing by a user of the web browser; and
the request received by the server includes an edited version of the set.

22. A server for doing at least one of (1) syntax checking and (2) loading and running a script or program that is passed via a web browser to said server for syntax checking or execution thereon, the server comprising a processor and a memory, the server being operable to perform a method including:

providing a first web page including at least one fill-out form to said web browser running on said remote terminal, the first web page being configured to accommodate at any given moment via the at least one fill-out form an entirety of a set of commands that are to be contained in a script or program;

receiving a request, including said set in the format of at least one common gateway interface (CGI) variable, from said web browser at the remote terminal;

running a CGI script that operates upon the at least one CGI variable to do at least one of (1) checking the syntax of said set and (2) loading said set as a script file or program file into memory and executing said set; and providing at least a first version of a second web page to said remote terminal that includes results generated by the check for syntax or execution of said set;

said CGI script calling a compiler or interpreter and passing said set to said compiler or interpreter;

said compiler or interpreter compiling and running or interpreting said set, respectively;

said compiler or interpreter returning first output data of said set; and said CGI script building said second web page so as to include said first output data.

23. A terminal on a network, remote from a server, running a browser that implements a method of doing at least one of (1) syntax checking and (2) loading and running a script or program that has been passed via said browser to said server for syntax checking or execution thereon, the terminal comprising a processor and a memory, the terminal-performed method including:

the terminal, via the browser thereon, receiving a first web page from said server, the first web page including at least one fill-out form configured to accommodate at any given moment via the at least one fill-out form an entirety of a set of commands that are to be contained in a script or program;

the terminal, via the browser thereon, receiving said set from a user;

the terminal, via the browser thereon, making a request to said server, the request including said set in the format of at least one common gateway interface (CGI) variable, the request being configured to cause a server to run a CGI script that operates upon the at least one CGI variable to do at least one of (1) checking the syntax of said set and (2) loading said set as a script file or program file into memory and executing said set, such a CGI script (1) calling a compiler or interpreter on the server and passing thereto the set by which the set is compiled or interpreted and by which is returned first output data of the set and (2) building a second web page that includes the first output data; and the terminal, via the browser thereon, receiving the second web page from said server.

24. A computer-readable medium embodied comprising machine-executable instructions thereon to be processed by a server to cause said server to implement a method doing at least one of (1) syntax checking and (2) loading and running a script or program that is passed via a browser to said server for syntax checking or execution thereon, the method including:

providing a first web page including at least one fill-out form to said web browser running on said remote terminal, the first web page being configured to accommodate at any given moment via the at least one fill-out form an entirety of a set of commands that are to be contained in a script or program;

receiving a request, including said set in the format of at least one common gateway interface (CGI) variable, from said web browser at the remote terminal;

running a CGI script that operates upon the at least one CGI variable to do at least one of (1) checking the syntax of said set and (2) loading said set as a script file or program file into memory and executing said set; and providing at least a first version of a second web page to said remote terminal that includes results generated by the check for syntax or execution of said set;

said CGI script calling a compiler or interpreter on said server and passing said set to said compiler or interpreter;

said compiler or interpreter compiling and running or interpreting said set, respectively;

said compiler or interpreter returning first output data of said set; and said CGI script building said second web page so as to include said first output data.

25. A computer-readable medium comprising machine-executable instructions embodied thereon to be processed by a terminal on a network, remote from a server of said network, running a browser that causes said terminal to implement a method of doing at least one of (1) syntax checking and (2) loading and running a script or program that has been passed via said browser to said server for syntax checking or execution thereon, the method including:

receiving, by the browser, a first web page from said server, the first web page including at least one fill-out form configured to accommodate at any given moment via the at least one fill-out form an entirety of a set of commands that are to be contained in a script or program;

receiving, by the browser, said set from a user;

making, by the browser, a request to said server, the request including said set in the format of at least one common gateway interface (CGI) variable, the request being configured to cause a server to run a CGI script that operates upon the at least one CGI variable to do at least one of (1) checking the syntax of said set and (2) loading said set as a script file or program file into memory and executing said set, such a CGI script (1) calling a compiler or interpreter on the server and passing thereto the set by which the set is compiled or interpreted and by which is returned first output data of the set and (2) building a second web page that includes the first output data; and the browser receiving the second web page from said server.

* * * * *